3,188,880
STEERING COLUMNS FOR MOTOR VEHICLES
Frank Alexander Caine, Stoke, Coventry, England, assignor to Humber Limited, Coventry, England, a British company
Filed Nov. 20, 1963, Ser. No. 325,103
4 Claims. (Cl. 74—493)

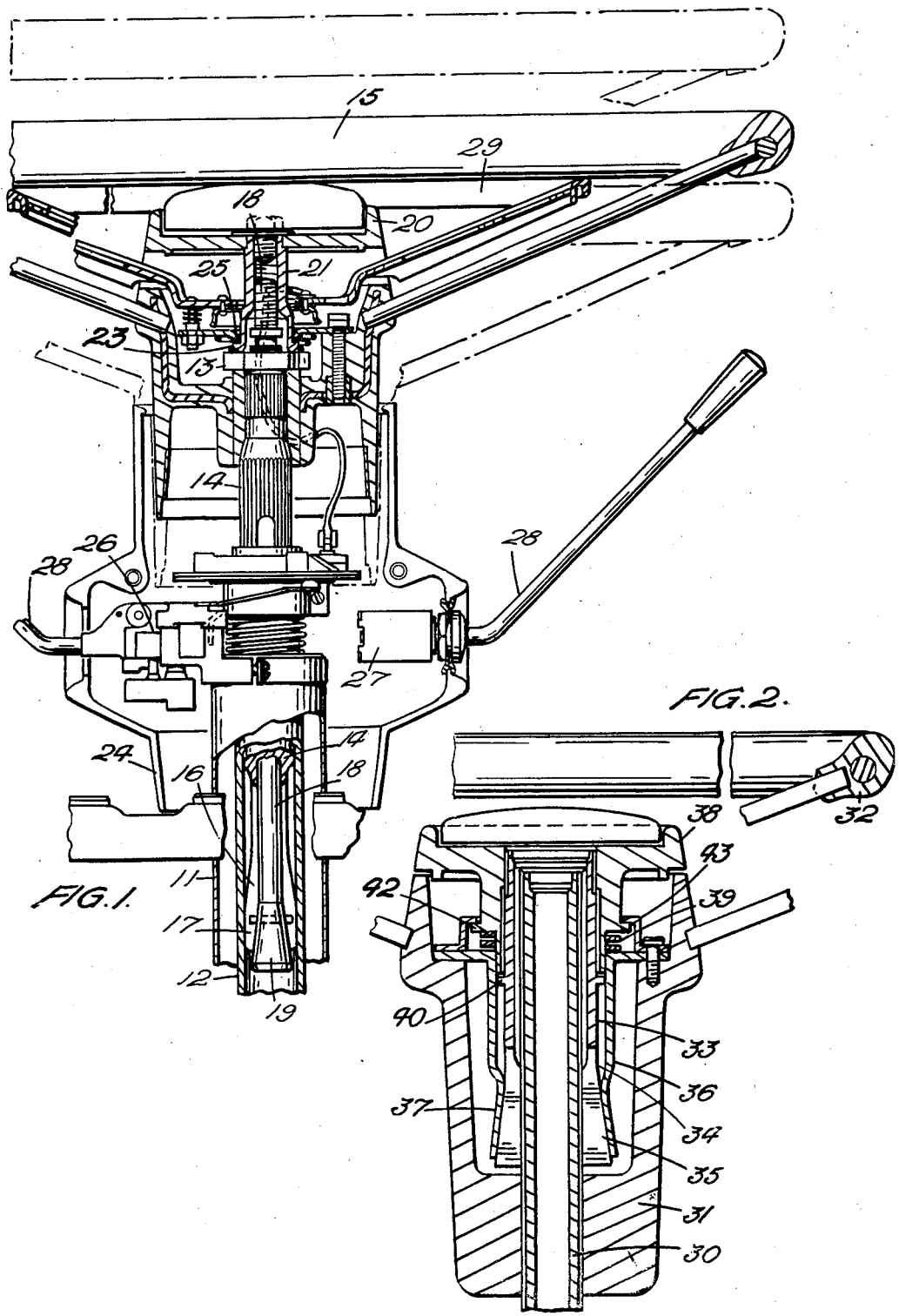

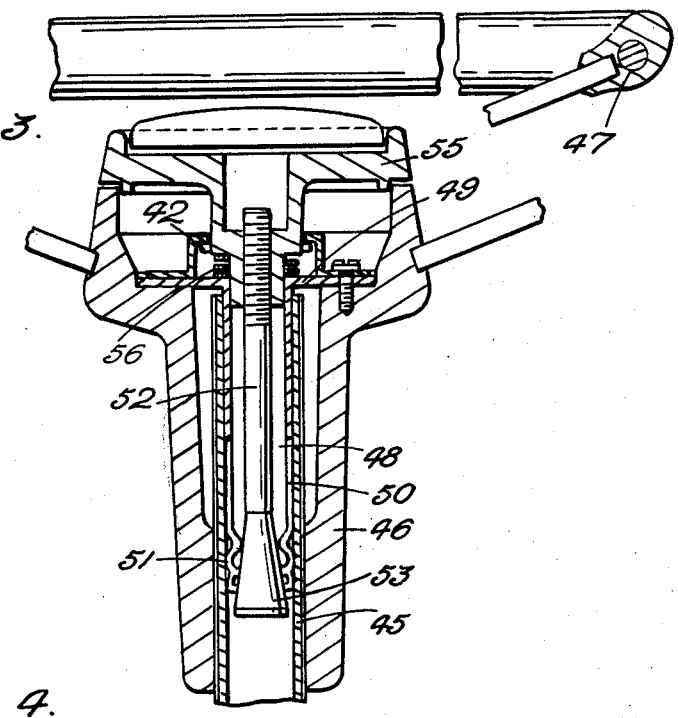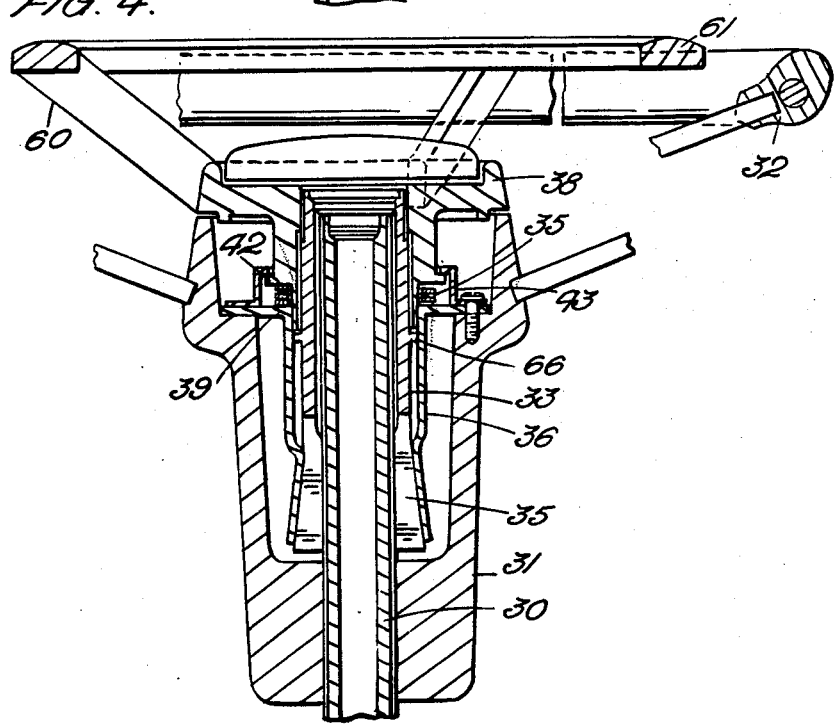

This application is a continuation-in-part of my application No. 113,859 filed on May 31, 1961 now abandoned.

The invention relates to steering columns for motor vehicles and of the kind comprising a fixed outer support tube and a rotatable steering shaft supported within the tube by bearings, one end of the shaft projecting from one end of the support tube and carrying a steering wheel and the other end of the shaft being connected by appropriate mechanism to running wheels whereby rotation of the shaft effects steering movements of the wheels.

Various arrangements have been proposed whereby the effective length of such a steering column may be varied to enable the position of the steering wheel to be adjusted to suit individual drivers. Such known arrangements have however various disadvantages, for example several of the known constructions are awkward to adjust. It is one object of this invention to provide an improved construction of steering column of the above kind which is adjustable in length.

It is a further object of the invention to provide a construction of steering column which has a novel safety feature.

The invention provides a steering column for a motor vehicle comprising a rotatable steering shaft comprised of two telescoping tubes, splines interlocking the tubes against relative rotation while permitting telescoping movement thereof, a steering wheel attached to an outer end of one of the tubes, a wedge member movable axially of the tubes to lock the tubes together against relative axial telescopic movement, said wedge member having its smaller end towards the steering wheel, a rotatable member of large diameter for hand rotation at the centre of the steering wheel, resilient means partially compressed between the rotatable member and the said outer end, the rotatable member being in thrust transmitting relation through the resilient means with the outer end aforesaid and an elongated tension member passing through the said one of the tubes and interconnecting the wedge member witth the rotatable member, said tension member having screw-threaded engagement with one of the wedge and rotatable members and being fixed to the other of these two members.

The construction above described has the advantage that a heavy axial pressure on the rotatable member, such as might arise in an accident, compresses the resilient means with an effect equivalent to loosening of the rotatable member whereby the wedge is moved to allow telescoping movement of the two tubes.

The invention further provides a steering column for a motor vehicle comprising a rotatable steering shaft comprised of two telescoping members, splines interlocking the members against relative rotation while permitting telescoping movement thereof, a steering wheel attached to an outer end of one of the telescopic members, a wedge member intermediate in the length of the shaft and movable axially of the telescopic members to lock the members against relative axial telescopic movement, a rotatable member of large diameter for hand rotation at the centre of the steering wheel, means restricting relative movement in both directions axially of the shaft between said rotatable member and said one of the telescopic members and an elongated member capable of transmitting both thrust and tension in the axial direction interconnecting said wedge and said rotatable member, said elongated member having screw-threaded engagement with one of the wedge and rotatable members and being fixed to the other of these two members.

The construction just described has the advantage that manual rotation of the rotatable member in one direction moves the wedge to lock the telescopic tubes whereas rotation in the other direction forces the wedge out of its locking position.

Specific constructions according to the invention of steering columns for motor cars will now be described, by way of example, with reference to the accompanying drawings in which:

FIGURE 1 is a section through a first construction,
FIGURE 2 is a section through a second construction,
FIGURE 3 is a section through a third construction, and
FIGURE 4 is a section through a fourth construction.

The column of FIGURE 1 comprises a sloping outer support tube 11 which is fixedly attached adjacent to its upper and lower ends to the vehicle body. Within this tube there is a telescopic rotatable tubular steering shaft, having an outer tube 12 supported on bearings within the support tube. An inner tube 14 projects from the upper end of the outer tube 12 and carries at its upper end, a steering wheel 15 secured by a nut 13. The two tubes are splined together.

The lower end of the inner tube 14 is formed with four axially extending slots or slits 16 equally spaced circumferentially whereby the walls of the tube, over a portion at the lower end, are divided into four radially expandable tongues. Over part of this portion the tube is internally tapered at 17, the larger diameter being nearer to the end of the tube. A long bolt or tension member 18 passes through the inner tube and has, at its lower end, a tapered expander head 19 which fits within the tongues of the tube so that movement of the head along the tube towards the steering wheel expands the tongues into gripping engagement with the outer tube. At the steering wheel end the bolt projects from the tube and through the centre of the steering wheel where it carries a large nut or handwheel 20. This nut has a hub 21 of reduced diameter which bears on the nut 13 on the end of the inner tube used to secure the steering wheel, and manual screwing-up operation of the handwheel serves to draw the expander 19 along the tube to expand the tongues. The expander head 19 has a key 22 working in one of the slots in the tube 14. On the inner end of the hub 21 there is a rib or lip 23 which engages under an annular plate 25 fixed to the hub of the steering wheel. Unscrewing of the hand wheel 20 on the bolt 18 brings the lip 23 into contact with the plate 25 and further unscrewing then forces the bolt inwardly to disengage the expander 19 from the tongues and so to release the tubes 14 and 12 for sliding movement of one within the other to adjust the height of the steering wheel.

A fairing 24 surrounds the upper end of the support tubes and houses switches 26, 27 for controlling direction indicators and an overdrive, the switches having control levers 28 which extend outside the fairing. The steering wheel also carries a horn ring 29.

A resilient ring or washer may be provided between the handwheel hub and the nut 13.

In the column shown in FIGURE 2 a steering tube 30 at its upper end has exterior splines on which engages a splined hollow hub member 31 on which is mounted the steering wheel 32. The lower end of tube 30 engages in a support tube (not shown) as described hereinbefore.

Within the hollow support member a tubular tension member 33 surrounds the upper end of the tube 30 and has its lower end slotted at 34 to form four wedges 35 which engage in the splines on tube 30. A second tubular member 36 rigidly attached to the hub 31 has a conical end 37 corresponding to said wedges and surrounding them, so that upward movement of the tension member 33 forces the wedges up between the conical end and the splines whereby the wedges are urged firmly into contact with the splines so that sliding of the wedges on said splines is frictionally opposed.

The upper end of the tension member 33 extends above the tube 30 and has screw-threaded thereto a nut 38 such that manual rotation of the nut causes the tension member 33 to move axially.

A coil spring 39 is interposed between the nut and the second tubular member 36, so that screwing down of the nut tends to compress the spring. Substantial axial pressure on the nut, i.e. more than normal adjustment or usage pressure, compresses the spring further and thereby releases the wedges 35 so that the steering wheel and hub 31 are free to slide down the tube 30.

A rib or projection 40 is provided on the tension member 33 and the inner end of the nut 38 bears on this projection when the spring has been compressed to a suitable degree, whereby over-compression of the spring is prevented.

The nut 38 has a rib or flange 42 which engages under a reaction stop 43 secured to the tube 36 and the steering wheel. This ensures that when the nut is unscrewed the wedges will be forced downwardly and released.

The arrangement of FIGURE 3 has a steering tube 45 the lower end of which is supported in a support tube (not shown). The upper end is externally splined and is engaged by an internally splined part of a hollow hub 46, on which hub is mounted the steering wheel 47. Rotation of the steering wheel is transmitted through the splines to the steering tube 45, but the steering wheel and hub are free to slide axially of the steering tube to adjust the position of the steering wheel.

Within the upper end of the steering tube 45 and protruding therefrom is a second tube 48, the protruding end of which is formed with an annular plate 49 which is rigidly attached to the hub 46. The second tube therefore slides in the steering tube 45 with axial movement of the hub. The end of the second tube 48 inside the steering tube is slotted at 50 to provide four radially expandable tongues which are corrugated as at 51. A long bolt 52 passes through the second tube and has, at its lower end, a tapered expander head 53 which fits within the corrugations of the tongues, so that movement of the head upwardly relative to the second tube expands the tongues into gripping engagement with the steering tube.

At the upper end the long bolt projects from the second tube and is engaged and held in position by a nut 55. The nut bears upon the plate 49 through a release spring 56, so that substantial pressure on the nut will cause the spring to compress, so releasing the expander head and permitting the hub and steering wheel to slide down the steering tube 45.

A rib 42 and reaction stop 43 are provided, as in the previous example.

FIGURE 4 shows a variation of the construction shown in FIGURE 2. In this construction there are, substantially as in FIGURE 2, a steering tube 30, a hub member 31, steering wheel 32, tension member 33 with wedges 35, and a tubular member 36.

There is also a nut 38 which, in this embodiment, has spokes 60 carrying a ring 61 within the compass of the steering wheel 32 but projecting above the plane of the steering wheel. This ring greatly facilitates the manual tightening and loosening of the nut 38. As in the construction of FIGURE 2, the lower end of the nut sleeve bears on a stop rib 66 on the member 33. Also as in FIGURE 2 reaction stop 43 engage a rib 42 and there is a spring 39 between a step on the nut and the fixed outer tube 36.

In each of the examples shown in FIGURES 2–4 the arrangement is such that a downward blow on the nut 38 or 55 (or the ring 61), as may happen for example by the driver's body striking the nut in an accident, will compress the spring 39, or 56 and release the wheel which will allow the wheel to slide down the steering tube. The same result may be obtained in the example shown in FIGURE 1 if a spring is provided between the handwheel hub and the nut 13.

I claim:
1. A steering column for a motor vehicle comprising a rotatable steering shaft comprised of two telescoping tubes, splines interlocking the tubes against relative rotation while permitting telescoping movement thereof, a steering wheel attached to an outer end of one of the tubes, a wedge member movable axially of the tubes to lock the tubes together against relative axial telescopic movement, said wedge member having its smaller end towards the steering wheel, a rotatable member of large diameter for hand rotation at the centre of the steering wheel, resilient means partially compressed between the rotatable member and the said outer end, the rotatable member being in thrust transmitting relation through the resilient means with the outer end aforesaid and an elongated tension member passing through the said one of the tubes and interconnecting the wedge member with the rotatable member, said tension member having screw-threaded engagement with one of the wedge and rotatable members and being fixed to the other of these two members.

2. A steering column as claimed in claim 1 and having on the said rotatable member and on the said tension member abutments which mate to limit the extent of screw-threaded movement of the rotatable member along the tension member in one direction and to limit the degree of compression of the resilient member.

3. A steering column for a motor vehicle comprising a rotatable steering shaft comprised of two telescoping members, splines interlocking the members against relative rotation while permitting telescoping movement thereof, a steering wheel attached to an outer end of one of the telescopic members, a wedge member intermediate in the length of the shaft and movable axially of the telescopic members to lock the members against relative axial telescopic movement, a rotatable member of large diameter for hand rotation at the centre of the steering wheel, means restricting relative movement in both directions axially of the shaft between said rotatable member and said one of the telescopic members and an elongated member capable of transmitting both thruust and tension in the axial direction interconnecting said wedge and said rotatable member, said elongated member having screw-threaded engagement with one of the wedge and rotatable members and being fixed to the other of these two members.

4. A steering column as claimed in claim 3 in which the wedge member has its smaller end towards the steering wheel, in which the said movement restricting means permit a limited amount of axial movement of the rotatable member and in which there are included resilient means urging said rotatable member towards the limit of its restricted movement in the direction to draw the wedge towards the steering wheel and into its locking position.

References Cited by the Examiner

UNITED STATES PATENTS 1,175,744 3/16 Giles _____ 74—551.1 X
2,331,996 10/43 Maurer _____ 74—493

BROUGHTON G. DURHAM, *Primary Examiner.*